United States Patent [19]
Holzer

[11] Patent Number: 5,484,888
[45] Date of Patent: Jan. 16, 1996

[54] GELATIN PRODUCTION

[76] Inventor: David Holzer, 545 W. 37th St., Miami Beach, Fla. 33140

[21] Appl. No.: 208,002

[22] Filed: Mar. 8, 1994

[51] Int. Cl.$^6$ ............... C07K 14/435; C07K 1/14; A23J 3/06
[52] U.S. Cl. ............... 530/355; 530/354; 530/857; 426/32; 426/576
[58] Field of Search ................. 530/354, 355, 530/857; 426/32, 573, 576

[56] References Cited

U.S. PATENT DOCUMENTS

| | | | |
|---|---|---|---|
| 4,064,008 | 12/1977 | Petersen et al. | 435/273 |
| 4,351,639 | 9/1982 | Monsheimer et al. | 8/84.16 |
| 5,093,474 | 3/1992 | Grossman et al. | 530/355 |
| 5,194,282 | 3/1993 | Grossman et al. | 426/549 |
| 5,210,182 | 5/1993 | Nasrallah et al. | 530/355 |

OTHER PUBLICATIONS

Hamada "Effects of the Preparation Conditions on The Physical Properties of Shark–Skin Gelatin Gels" Abstract Bull Jap Soc. Sci Fish. 56(4) 1990 671–677.

Kim et al. "The Suitable Processing Conditions for Gelatin Preparation from Dover Sole Skin" Abstract J Korean Agr. Chem. Soc. 36(6) 1993 440–448.

*Primary Examiner*—Michael G. Wityshyn
*Assistant Examiner*—Nancy J. Degen
*Attorney, Agent, or Firm*—Israel Nissenbaum

[57] ABSTRACT

Gelatin, having high Bloom or gel strength in excess of 300, is extracted from fish, with high yield, by pre-treating collagen rich fish skins with a limewater ($Ca(OH)_2$) solution suspension with a concentration of between 19 gm of $Ca(OH)_2$/liter of water/kg of tilapia fish skin to 100 gm $Ca(OH)_2$/liter of water/kg of fish skin for a period of time between ten to sixty days and optimally between two to four weeks. For fish with higher percentage of fat content, a minimum concentration is at least 50 gm of $Ca(OH)_2$/liter of water/kg of fish skin to avoid putrefaction. For fish with easily extractable gelatin, such as Nile perch, soaking time is from 3 to 10 days with a concentration of $Ca(OH)_2$/liter of water of about 15 gm. At concentrations above 100 gm of $Ca(OH)_2$/liter of water/kg of fish skin and/or treatment time periods in excess of four weeks, Bloom strength dramatically decreases. Acid treatment followed by additional limewater treatment restores Bloom strength lost by excessively long initial limewater treatment.

18 Claims, No Drawings

GELATIN PRODUCTION

FIELD OF THE INVENTION

This invention relates to gelatin production and particularly the extraction of high Bloom gelatin from fish skins.

BACKGROUND OF THE INVENTION

Gelatin, a collagen derivative, is utilized in various facets of food, photographic and medication production. Gelatin is a primary ingredient of gel type desserts, marshmallows and the like. It is also utilized in the production of capsules for time release ingested medication and emulsion gels in photographic applications. In almost all instances, commercial viability of the gelatin is determined by its rigidity or gel strength, with higher gel strength being most desired.

The standard measurement of gel rigidity is known as Bloom strength and it is defined as the weight, in grams, required to make a 0.5" (1.27 cm) diameter, flat bottomed plunger depress the surface of a gelatin gel 4 mm. The weight is applied in grams of lead shot and generally ranges between 100–300. Commercially desirable gelatin has a production line Bloom strength which generally ranges between 250–260.

The rigidity of the gelatin gel is directly related to its proline and hydroxyproline content. Accordingly, extraction methods, from various gelatin sources, must preserve some measure of the proline and hydroxyproline content in order to produce gelatin with acceptable Bloom strength levels.

Gelatin, in relatively high yield and of high Bloom strength, is commonly economically produced from bones and hides of animals and particularly from pigskin. The collagen contained therein is converted to gelatin by alkaline or acid pre-treating, typically by immersion in baths with periodic aeration mixing, for extended periods of time. A common pretreatment method which provides relatively high yield (10–15%) and high gel strength (Bloom strength of 250–260) in commercially available animal derived gelatin, is treatment with strong alkaline solutions for about sixty days prior to extraction. Alternatively, the bones and hides are treated with hydrochloric or sulfuric acid for the extended periods of time. Gelatin extraction thereafter, results in readily discernible type A and type B gelatins depending upon whether there was an initial acid or alkaline treatment.

The standard extraction methods involve neutralizing the alkaline or acid treated bones and hides and placing them in a neutral water bath. The temperature of the bath is brought to a level in the range of 50°–60° C. (lower temperatures result in lower yields and incomplete extraction and higher temperatures tend to degrade the gelatin production or the quality of gelatin being produced) with the solid gelatin being extracted into the water. At monitored levels of solids forming in the water, typically 5%, additional steps of filtering and drying are effected to purify the extracted gelatin and to raise the levels, in stages, to about 30–32%. At this point, the extraction is considered complete and the water containing gelatin is dried, and the solid gelatin is granulated and ground to specifications.

For religious or other reasons, there are substantial segments of the populace, e.g. orthodox Jews, Moslems, vegetarians, etc. who find the common animal sources of gelatin as being inimical with their beliefs. Accordingly, other gelling materials have been utilized for foods and medication for such members of the populace. An example of a common, alternative non-animal gelling material is agar agar, a seaweed derivative. Gelling strength of such alternative materials has however been mediocre (equivalent to Bloom strength of about 100–200), and palatable sources of gelatin, other than the common animal derivatives have been sought.

Methods for the extraction of gelatin from fish; in particular fish having fins and scales (kosher fish), a more palatable source for orthodox Jews; Moslems and many vegetarians, have been known for some years. In such methods the collagen rich fish skins (particularly of warm water fish species) and to a lesser extent, swim bladders, are treated, to form and extract gelatin. However, the efficacious extraction methods, commonly utilized with the animal sources for gelatin, particularly the alkaline methods, for extended time periods, tend to result in unusable fish skins and swim bladders, with little, if any, extractable useful gelatin. In particular, such methods do not allow for extraction prior to putrefaction of the fish. Fish, particularly species with high fat content, are highly susceptible to rapid bacteria development and putrefaction after only short time periods. Furthermore, gelatin extracted from fish is susceptible to an objectionable characteristic fish smell, associated, in part, with even small degrees of putrefaction.

With many acid based extraction methods, including the ones presently being commercially utilized, the collagen found in many fish has exhibited significantly lower levels of hydroxyproline and proline with relatively lower gelling strength, than required for real commercial viability. In addition, gelatin yield, with acid based extraction methods, even under the most ideal laboratory conditions, rarely exceeds 15%.

SHORT DESCRIPTION OF THE INVENTION

The present invention comprises a method of producing gelatin from fish skins, comprising the steps of:

a. soaking the skins in an alkaline hydroxide containing solution such as a $Ca(OH)_2$-containing limewater solution suspension for a period of time of between three to sixty days. The particular optimal time period is dependent upon the fish species and the ease with which the gelatin is extractable therefrom. The alkaline hydroxide or limewater solution suspension comprises a minimum concentration of $Ca(OH)_2$/liter of water (with an optimal amount of one liter of limewater suspension solution/kg of fish skins), at least sufficient to retard putrefaction of the fish skins, from at least just prior to the normal time for onset of putrefaction of the fish skins (depending upon fish species) and continuing for the duration of the soaking. Onset of putrefaction for most fish species in this regard is usually no more than about ten days, after the beginning of the soaking. For fish skins which require less than ten days of soaking (thus, without problems of putrefaction prior to completion of the soaking), at least 10 and preferably at least 15 grams of $Ca(OH)_2$/liter of water/kg of fish skin, should be used during the period of time of soaking;

b. removing excess limewater from said fish skins, while maintaining the fish skins in an alkaline state; and c. extracting gelatin from the alkaline fish skins, in accordance with standard gelatin extraction methods.

Though $Ca(OH)_2$ is preferred, other alkaline hydroxides such as $Mg(OH)_2$ are similarly utilizable either separately or in combination with the $Ca(OH)_2$.

It is an object of the present invention to provide a method for pretreatment and for gelatin extraction from fish skins and, to a lesser extent, from swim bladders with both high yield and high Bloom strength. Hereinafter, the term "fish skins" shall encompass both fish skins and swim bladders.

It is a further object of the present invention to provide such pretreatment method, whereby the fish skins are in the alkaline state during gelatin extraction, without putrefaction or destruction of the fish skins.

It is a still further object of the present invention to provide such method wherein extracted gelatin has little or no characteristic fish smell.

These and other objects, features and advantages of the present invention will become more evident from the following discussion.

DETAILED DESCRIPTION OF THE INVENTION

Generally the present invention comprises a method for treatment of fish skins (particularly for use with fish species whose uncooked skins are readily available as a waste product), which increases the yield of subsequent collagen formation and gelatin extraction, while maintaining satisfactory proline and hydroxyproline levels, whereby the extracted gelatin can provide commercially desirable Bloom strength in excess of 200 and preferably in excess of 250. Cooking of fish skins, such as in commercial processing of tuna, tends to destroy the collagen content, making such skins generally unsuitable for gelatin extractions. Examples of commercial kosher fish having uncooked skins, available in large scale amounts, include tilapia, snapper, carp, perch (including Nile perch), and generally many other warm water fish having the kosher characteristics of fins and scales.

In accordance with the present invention, for optimum pre-treatment effect, the fish skins are pre-cleaned (including removal of excessive fats, flesh, bones and scales), and washed in water. In accordance with the present invention the fish skins are soaked in an alkaline hydroxide solution and particularly a $Ca(OH)_2$ (calcium hydroxide or hydrated calcium oxide), limewater solution suspension, with a concentration of at least 19 gm $Ca(OH)_2$/liter of water, for a relatively low fat containing fish such as tilapia, and at least 50 gm $Ca(OH)_2$/liter of water for fish, such as carp, having a higher fat content than tilapia. The duration of the pre-treating limewater soaking (liming) is at least one week and more preferably, at least two weeks for most fish, but not more than about four weeks (for optimal Bloom), unless, subsequently, lost Bloom strength is restored by acid treatment, in another aspect of the present invention, as will be described. For some fish, most notably Nile perch, duration of the liming pretreatment is from two to ten days for obtaining optimal Bloom. Accordingly, for such fish, the concentration of the limewater can be as low as 10 gm $Ca(OH)_2$/liter of water and more preferably at least 15 gm $Ca(OH)_2$/liter of water. With such fish, pre-treatment is completed before the onset of putrefaction and higher concentration levels are not as necessary, as are required for fish such as tilapia and carp which need longer pre-treatment periods for obtaining gelatin with optimal Bloom.

The soaking should, in all instances, not however exceed 60 days, even with the acid restoration treatment, since maximum Bloom strength, even with acid treatment restoration, falls rapidly and irretrievably, thereafter.

Saturated limewater ($Ca(OH)_2$ solution) contains about 1.8 gms/liter of solution, with a pH which remains substantially constant at 12.4, for saturated $Ca(OH)_2$ and limewater solution suspensions. A limewater suspension, with 16 gms of $Ca(OH)_2$/liter of water is the standard material utilized in the alkaline treating of animal hides and bones for gelatin extraction. The standard animal alkaline treatment is however, also usually at least 60 days in duration. However, treatment of fish skins, of even freshly caught and processed fish, with the standard limewater suspension results in putrefaction in a short time (generally no more than about ten days), with fish, such as tilapia and carp, and it was not believed that alkaline treatment would be effective for fish skins or that a usable gelatin could be extracted thereby. Accordingly, gelatin extraction from fish skins has been effected only with acid treatment.

It has however, been discovered that liming with solutions having a $Ca(OH)_2$ concentration of at least 19 gms/liter of water for relatively low fat fish such as tilapia and fish having the same or lower fat percentages, with increase of concentration (to levels determined by fish species and fat content thereof), prior to normal onset of putrefaction, retards such putrefaction, at room temperature (about 20° C.), for at least the two to four week time period required for pretreatment in accordance with the present invention. Higher ambient temperatures, which accelerate bacteria growth, necessitate higher amounts of the $Ca(OH)_2$ and conversely lower ambient temperatures, which retard bacteria growth, require lesser amounts. It is not necessary that the liming be initiated with the 19 gms/liter. The pretreatment may be initiated at lower levels such as 10 to 15 gms/liter. However, prior to the normal onset of putrefaction, the alkaline treating bath should be brought to and maintained at at least such minimum concentration levels for the lowest fat content fish and higher for the higher fat content fish. In this regard, for fish having more easily extractable gelatin, such as Nile perch, wherein it has been discovered that a pre-treatment duration, for optimal Bloom, is no longer than the time for initial onset of putrefaction (i.e., no more than about ten days), the lower levels may be effectively maintained for the entire pre-treatment.

For fish with higher fat percentages than the relatively "lean" tilapia, such as carp and fish having the same or higher fat percentages, at least 50 gm $Ca(OH)_2$/liter of water, is required in the liming bath, prior to putrefaction, in order to prevent or substantially retard the detrimental putrefaction. Corresponding fish with fat percentage contents between that of tilapia and carp require corresponding minimum amounts of $Ca(OH)_2$ to retard putrefaction. Excessive $Ca(OH)_2$ suspension amounts will however result in markedly lower Bloom strengths. Thus, with suspensions having in excess of 100 gm $Ca(OH)_2$/liter of water, Bloom strength of subsequently extracted gelatin, can be less than a quarter that of fish skins treated with the lower concentrations.

For effective collagen converting pre-treatment, it is preferred that for each kilogram of fish skins, there should be at least one liter of the limewater suspension. This substantially ensures full pretreatment reaction between the lime and the fish skins. It is also desirable that the suspension solution be mixed by periodic aeration (a standard procedure utilized in animal hide treatment).

If necessary, or desired, during the soaking pretreatment, additional lime can be added to the suspension solution to maintain the $Ca(OH)_2$ content at minimum or optimum levels for the fish being treated.

Controlled pretreatment duration is also important with respect to obtaining optimum or maximum Bloom strength. Optimum pre-treatment liming duration for most fish is between two to four weeks and after four weeks, Bloom strength rapidly drops by about a third at the fifth week for these fish. For fish such as perch, particularly Nile perch, optimum pre-treating liming duration is only several days, with rapid Bloom deterioration after only about a week.

Some measure of Bloom strength can be recovered with fish skins, treated for excessive periods of time, by using an acid to lower the pH, of the pre-treated fish skins, to weak acid levels (about pH of 5) and thereafter re-liming to a pH of 10, prior to extraction of the gelatin. However, the longer the excessive time period of pretreatment exceeds four weeks, prior to the acid treatment, the lower the recoverable Bloom strength.

At optimum amounts of $Ca(OH)_2$/liter of water, ranging between 25 gm to 100 gm, and with soaking pre-treatments for periods of time ranging between two to four weeks, very high production line Bloom strengths of extracted gelatin, generally between 250–300, and even in excess of 300, have been obtained. In addition, gelatin yield often exceeds 20%, as compared to prior art fish gelatin extraction methods which rarely, if ever, exceed 15%. For fish, such as Nile perch, gelatin with Bloom strength in excess of 230, is extractable after only three days and with relatively low concentrations of 15 gm $Ca(OH)_2$/liter of water. With such fish, increased concentration and increased time however tends to reduce the Bloom strength.

After the preferred initial steps, in the gelatin production; of cleaning, followed by washing in cold water, the fish skins are soaked in the controlled limewater suspension solution, for the requisite period of time (at least several days and, depending upon the fish species, usually between two to four weeks). Thereafter, the alkaline pre-treated fish skins and/or swim bladders are rinsed in cold water to remove alkaline residue, with the fish skins remaining in an alkaline state (e.g., limed tilapia skins, after removal of limewater residue, have a pH of 10). Gelatin extraction is thereafter effected with the fish skins in the alkaline state. This is in contrast to prior art methods, used with animal hides and fish skins, wherein the hides and fish skins are either in an acid or substantially neutral state during extraction.

The fish skins are treated for gelatin extraction by being placed in cold water and heated to a temperature between 45°–55° C. The water is maintained at the elevated temperature and monitored until a 5% solids containing suspension is obtained. The suspension is filtered, preferably through successive 30, 20, 10 and 5 micron micro-filters (or similar combination) and is then passed through an acidic cationic ion exchange resin (e.g., cation and strong acid resin C100H Purolite filter) which reduces the filtrate pH to about 5. The micro-filters, in conjunction with the ion exchange resin, remove amines and reduce the characteristic fish smell to near negligibility. The suspension is then first evaporated to 12% solids and further evaporated to a 30–32% solids, jelly-like state, then placed in molds. The molds are then dried to obtain a solid residue of gelatin which is granulated, dried, and reground to particular use specifications.

Depending on the condition of the fish skins after the initial gelatin extraction, additional extractions can be effected with little loss of Bloom strength. Total production type line extractions provide gelatin yields, using the method of the present invention, in excess of 20%, a more than one third increase over prior art laboratory controlled yields. The extracted gelatin surprisingly has significantly more proline and hydroxyproline than originally found with acid extraction methods. Gelatins, extracted with the treatment method of the present invention, provided an average production line Bloom strength well in excess of 250, and, under defined optimum conditions, provided production line Bloom strengths in excess of 300.

Though the present method has been described as having special utility in providing gelatin which accommodates the dietary needs of orthodox Jews, Moslems, and some vegetarians; it has applicability to non-ingestion applications and/or those with general requirements of high Bloom strength gelatins (e.g. in excess of 300) which can be filled with gelatin extracted from non-kosher fish, particularly of warm water species. In this regard it is noted that there is a significant ecological and economic advantage with the utilization of fish skins. Fish skins are generally considered to be pure waste, as opposed to animal hides, which can be made into leather; and animal bones, which can be made into bone meal.

In order to more clearly illustrate the efficacious nature of the present invention, particularly in production type environments, the following Examples and comparative Examples describe use of the method of the present invention in such environments and as compared to prior art type methods. It is understood that the Examples are illustrative in nature and that details contained therein are not to be construed as limitations on the present invention.

EXAMPLE 1 (MODIFIED PRIOR ART)

Tilapia fish skins were cleaned and washed in cold water, and a 10 kg sample was placed in limewater suspension solution containing 16 gm $Ca(OH)_2$/liter of water/kg of fish skin. After ten days, the fish skins began to exhibit signs of putrefaction and were subsequently unsuitable for gelatin production.

EXAMPLES 2–5

Four samples of cleaned and washed tilapia fish skins (10 kg each), as in Example 1, were each placed in a limewater suspension solution containing 19 gm $Ca(OH)_2$/liter of water/kg of fish skin. No evidence of putrefaction was noted. After 10 days, additional $Ca(OH)_2$ was added to the limewater suspension solution of each sample, to raise the concentration levels to 50, 75, 100 and 125 gm $Ca(OH)_2$/liter of water/kg of fish skin respectively. After soaking for periods of two weeks, three weeks and four weeks, with periodic standard aeration mixing, test samples of each treated sample were washed with cold water until the pH of the skins of the sample reached 10. Gelatin was then extracted in plain water, with two extractions, at temperatures ranging between 50°–55° C. The initial 5% solids suspension was successively filtered through micro-filters of 30, 20 and 10 microns and then passed through a strong acid cationic ion exchange resin (Purolite C100), prior to continued drying and granulation. The gelatin did not have any discernible fish odor. Bloom strength of the resultant extracted gelatin is given in the following Table.

TABLE

| Ex. no. | Limewater concentration (gm/liter water) | Bloom 2 weeks | 3 weeks | 4 weeks |
| --- | --- | --- | --- | --- |
| 2 | 50 | 49 | 134 | 248 |
| 3 | 75 | 84 | 154 | 252 |
| 4 | 100 | 31 | 141 | 61 |
| 5 | 125 | 104 | 163 | 100 |

Bloom declined, after four weeks, under the treatment conditions of Examples 2 and 3. From the above, it is evident that optimum treatment parameters, under laboratory conditions, are with limewater concentrations up to 100 gm/liter water and treatment time of between three to four weeks.

EXAMPLE 6

In a production run, 6463 kg of cleaned and washed tilapia fish skins, as in Example 1, were placed in a limewater suspension solution containing 19 gm $Ca(OH)_2$/liter of water/kg of fish skin. On the tenth day, the concentration was raised to 27 gm $Ca(OH)_2$/liter of water/kg of fish skin. There was no evidence of putrefaction. After soaking for periods of two weeks, three weeks and four weeks, and washing with cold water until the pH of the skins reached 10, gelatin was extracted in test samples, as in Examples 2–5. Bloom strength of the resultant extracted gelatin after two weeks was 310, after three weeks, 290, and after four weeks the Bloom had declined to 250.

EXAMPLE 7

The fish skins of Example 6 (after 30 days and a Bloom of 250) were treated with hydrochloric acid solution at pH 5, for a period of time sufficient to reach equilibrium. The skins were thereafter re-limed by using $Ca(OH)_2$ to raise the pH to 10. Gelatin extracted thereafter in plain water had a Bloom strength of 300.

EXAMPLE 8

A production run of 4233 kg of cleaned and washed tilapia fish skins, as in Example 1, were treated as in Example 6, but with an initial concentration of 35 gm $Ca(OH)_2$/liter of water/kg of fish skin. On the tenth day, the concentration was raised to 75 gm $Ca(OH)_2$/liter of water/kg of fish skin. Bloom strength of the resultant extracted gelatin after four weeks was 310, after five weeks 220, and after 59 days (normal treatment time for animal hides) the Bloom of the extracted gelatin had declined to 100.

EXAMPLE 9

The tilapia fish skins of Example 8, after the 59 days and with Bloom of 100, were acid treated and relimed as in Example 7. Gelatin extracted thereafter had a Bloom strength of 215.

EXAMPLE 10

Carp fish skins were treated as were the tilapia fish skins of Example 1 but with 25 gm of $Ca(OH)_2$/liter of water/kg of fish skin. Putrefaction began after about ten days.

EXAMPLE 11

Carp fish skins were treated as in Example 10 but with 50 gm of $Ca(OH)_2$/liter of water/kg of fish skin. Putrefaction was retarded for at least four weeks.

From the above Examples it is evident that threshold amounts of lime in suspension are required, in treating the fish skins (depending on fat content) to retard putrefaction and that excessive amounts of lime above 100 gm/liter of water and treatment duration in excess of four weeks cause significant reduction in Bloom strength. However, with excessive duration of treatment up to about 60 days it is possible to recover a Bloom strength to useful levels above 200, with an acid treatment to a pH of 5 followed with an additional liming to bring the fish skins to a pH of ten.

EXAMPLE 12

Gelatin made in accordance with Example 7, having been extracted at the standard temperature of 50° C., was used in making marshmallows. Though Bloom strength was in excess of 300, setting was poor.

EXAMPLE 13

Gelatin made in accordance with Example 12, but having been extracted at 45° C., was used in making marshmallows. Though Bloom strength was identical to that of the gelatin made in accordance with Example 12, setting in the production of marshmallows, therewith was much improved.

EXAMPLES 14–15

A sample of 2.5 kg of Nile perch skins was soaked in 15 gm of $Ca(OH)_2$/liter of water/kg of fish skin. After only three days the Bloom strength reached 231. After five more days (total 8 days of soaking) the Bloom strength had deteriorated to 175.

EXAMPLES 16–17

Another sample of 2.5 kg of Nile perch skins was soaked in 20 gm of $Ca(OH)_2$/liter of water/kg of fish skin. After three days Bloom strength was 205 and after an additional five days (total 8 days of soaking) Bloom strength reached 215.

EXAMPLES 18–20

Three separate samples of Nile perch, each of 3.0 kg were soaked in 20, 30, and 50 gm of $Ca(OH)_2$/liter of water/kg of fish skin and Bloom strength of each sample was tested after periods of ten days, sixteen days and 21 days. The 20 gm treating solution provided a Bloom strength of 199 after ten days which deteriorated to below 60 after sixteen and twenty one days. The 30 gm treating solution provided a Bloom strength no higher than 71 and the 50 gm treating solution provided a Bloom strength no higher than 34.

It is understood that the above specific steps and examples are merely illustrative of the present invention. Changes in cleaning, concentration, treatment steps, duration, extraction steps, parameters, and the like, particularly with respect to different types of fish, may be made without departing from the scope of the present invention as defined in the following claims.

What is claimed is:

1. A method of producing gelatin from fish skins, wherein said fish skins are from a kosher species of fish having fins and scales, said method comprising the steps of:

a. soaking the fish skins in an alkaline hydroxide solution suspension for a period of time of between three to sixty days; wherein, with soaking times in excess of ten days, said alkaline hydroxide solution suspension comprises, during soaking times in excess of ten days, a minimum concentration of alkaline hydroxide/liter of water/kg of fish skins, at least sufficient to retard putrefaction of the fish skins during a time of soaking in excess of ten days;

b. removing excess alkaline hydroxide solution suspension from said fish skins, while maintaining said fish skins in an alkaline state; and extracting gelatin from said alkaline fish skins.

2. A method of producing gelatin from fish skins, wherein said fish skins are from a kosher species of fish having fins and scales, said method comprising the steps of:

a. soaking the fish skins in a $Ca(OH)_2$-containing limewater solution suspension for a period of time of between three to sixty days; wherein, with soaking times in excess of ten days, said $Ca(OH)_2$-containing limewater solution suspension comprises, during soaking times in excess of ten days, a minimum concentration of $Ca(OH)_2$/liter of water/kg of fish skins, at least sufficient to retard putrefaction of the fish skins during a time of soaking in excess of ten days;

b. removing excess $Ca(OH)_2$-containing limewater solution suspension from said fish skins, while maintaining said fish skins in an alkaline state; and extracting gelatin from said alkaline fish skins.

3. The method of claim 2, wherein the concentration of $Ca(OH)_2$/liter of water is at least 10 grams for periods of soaking time less than ten days and wherein the minimum concentration is at least 19 grams for periods of time which exceed ten days.

4. The method of claim 3, wherein the concentration of $Ca(OH)_2$/liter of water for periods of time less than ten days is at least 15 grams.

5. The method of claim 2, wherein any excessive fats, flesh, bones and scales are removed from the fish skins prior to said soaking.

6. The method of claim 5, wherein the $Ca(OH)_2$-containing limewater solution suspension comprises at least one liter of said $Ca(OH)_2$-containing limewater solution suspension for each kilogram of fish being treated.

7. The method of claim 6, wherein said minimum concentration comprises about 19 grams of $Ca(OH)_2$ per liter of water, wherein said fish skins have a fat content no more than that of tilapia fish skins.

8. The method of claim 6, wherein said minimum concentration comprises about 50 grams of $Ca(OH)_2$ per liter of water, wherein said fish skins have a fat content equal to or greater than that of carp fish skins.

9. The method of claim 6, wherein the concentration of $Ca(OH)_2$ per liter of water ranges between 19 to 100 grams.

10. The method of claim 9, wherein the fish skins are soaked in said $Ca(OH)_2$-containing limewater suspension solution for a period of time between three days to four weeks.

11. The method of claim 9, wherein the concentration of $Ca(OH)_2$ per liter of water ranges between 15 and 75 grams.

12. The method of claim 11, wherein the fish skins are comprised of tilapia fish skins.

13. The method of claim 6, wherein, prior to said extraction of gelation, said fish skins are treated with acid to lower the pH of the pre-treated fish skins to weak acid levels and thereafter the fish skins are treated with alkali to bring said fish skins to an alkaline pH.

14. The method of claim 13, wherein said weak acid pH is about 5 and said alkaline pH is 10.

15. The method of claim 6, wherein said gelatin is extracted from the fish skins by:

a. placing the fish skins, after said soaking, into plain water, at a temperature ranging between about 45°–55° C.;

b. filtering the gelatin suspension obtained thereby through one or more micro-filters having a maximum pore size of 30 microns and obtaining a filtrate; and c. passing the filtrate through an acid cationic ion exchange resin, whereby any discernible fish odor is removed.

16. The method of claim 15, wherein the fish, after said cooking are placed into plain water at a temperature of about 45° C.

17. The method of claim 16, wherein said fish is selected from the group consisting of tilapia, perch, Nile perch, snapper and carp.

18. The method of claim 16, wherein the fish is Nile perch, the soaking time period is between 3 to 8 days and the minimum concentration of the $Ca(OH)_2$ per liter of water is 15 grams.

\* \* \* \* \*